Sept. 7, 1965 B. J. UDELSON 3,205,449

D.C. PUMPED ELECTROSTATICALLY FOCUSED PARAMETRIC AMPLIFIER

Filed June 21, 1963 3 Sheets-Sheet 1

INVENTOR,
BURTON J. UDELSON

BY Edward J. Kelly

Sept. 7, 1965 B. J. UDELSON 3,205,449

D.C. PUMPED ELECTROSTATICALLY FOCUSED PARAMETRIC AMPLIFIER

Filed June 21, 1963 3 Sheets-Sheet 2

INVENTOR,
BURTON J. UDELSON
BY Edward J. Kelly

INVENTOR,
BURTON J. UDELSON

BY Edward J. Kelly

United States Patent Office 3,205,449

Patented Sept. 7, 1965

3,205,449

D.C. PUMPED ELECTROSTATICALLY FOCUSED PARAMETRIC AMPLIFIER

Burton J. Udelson, Bethesda, Md., assignor to the United States of America as represented by the Secretary of the Army Filed June 21, 1963, Ser. No. 289,762
5 Claims. (Cl. 330—4.7)
(Granted under Title 35, U.S. Code (1952), sec. 266)

The invention described herein may be manufactured and used by or for the Government of the United States of America for governmental purposes without the payment to me of any royalty thereon.

This invention relates to electron beam devices and more particularly to a D.-C. pumped electrostatically focused parametric amplifier.

Of the many advances made in the microwave art in recent years, one of the most important is the discovery that the principles of parametric amplification can be applied to practical structures in order to obtain an amplifier having many highly desirable characteristics. The term "parametric amplifier" in general refers to a family of electrical devices in which amplification is achieved through the periodic variation of a circuit parameter. As applied to high frequency electron beam devices, the term generally refers to a device in which a signal wave is used to modulate the electron beam, the signal modulation being subsequently amplified through periodic variations of certain beam or circuit parameters by use of a "pump."

An early successful embodiment of the principles of parametric amplification applied to an electron beam device, was the quadrupole amplifier. Here, the amplifier includes an electron gun for projecting a stream of electrons, magnetic focusing for the electron beam, an input coupler of the resonant or Cuccia type, a quadrupole interaction region, an output coupler, and a collector. While highly satisfactory for many applications, this parametric type amplifier has several limitations. One of the chief limitations is that a pump energy, used to supply energy to the electron beam and produce amplification, must be twice the signal frequency. As the signal frequency becomes higher, the disadvantage resulting from a requirement of a pump operating at a frequency twice the signal frequency becomes more and more acute.

To overcome these disadvantages, especially apparent at the higher signal frequencies, several electon beam parametric amplifiers with low pump frequencies or with D.C. pumps have been developed. D.C. pumped devices are characterized by having three distinct sections, namely, an input coupler, a D.C. pumping section, and an output coupler. An RF signal applied to the input coupler is coupled onto the electron sheet beam in the form of a modulating transverse beam displacement. The D.C. pumping section acts to increase the amplitude of this transverse displacement at the cost of decreasing the beam's longitudinal velocity. Finally, the output coupler removes the transverse modulation from the beam, and converts it into an amplified output RF signal. All D.C. pumps can be classified into three basic types depending upon the wave interaction that takes place. The three types of wave interaction are: coupling between a fast and a slow cyclotron wave; coupling between a fast or slow cyclotron wave and a synchronous wave; and coupling between two synchronous waves.

These different types of D.C. pumps may be distinguished by reference to the general formula for the condition of D.C. pumping:

$$2L=n\lambda \qquad (1)$$

where, $n$=an integer, 1, 2, 3, 4 . . .
$L$=the spatial periodicity of the change of any of the parameters in the system, and
$\lambda$=the wavelength due to the natural resonant frequency of the system.

Coupling between a fast and a slow cyclotron wave is characterized by $n=1$. Coupling between a fast or slow cyclotron wave and a synchronous wave is characterized by $n=2$. Coupling between two synchronous waves is a special case of $n=1$, because both L and $\lambda$ are equal to infinity.

Several prior art devices have made use of these D.C. pumping principles. Usually the required natural resonance of the system is the cyclotron resonance due to the longitudinal magnetic focusing field, and special periodicity is achieved either by varying periodically the voltage along the length of the pumping section, or varying periodically the strength of the longitudinal magnetic field. While such devices have obviated the need for high pump frequencies, the use of a magnetic field makes these amplifiers bulky, heavy, and sensitive to both temperature variations and shock. Also, magnetically focused tubes can have different values of natural resonant frequency in the pump and coupler regions only by introducing additional pole pieces between these regions.

An object of this invention is to provide a D.C. pumped parametric amplifier which does not require a magnetic field either for focusing, or to establish a natural resonant frequency for the system.

Another object of this invention is to provide a D.C. pumped electron sheet beam parametric amplifier which is light weight, rugged, stable over a wide temperature range, and easy to construct.

Still another object of this invention is to provide a D.C. pumped electrostatically focused parametric amplifier which can have different natural resonant frequencies in the coupler and pump regions.

These and other objects of the present invention are accomplished by a novel D.C. pumped electron beam amplifier which has no magnetic field. The two functions of the magnetic field used in prior art devices, namely, the focusing of the electron beam and the creating of a cyclotron frequency are accomplished by the electrostatic focusing lenses.

The amplifiers of this invention include an electron gun for producing an electron beam, input and output electron beam couplers, a collector, and an electrostatically focused pump region between the couplers. The electrostatic focusing lenses, which produce the natural resonant electron beam frequency necessary for D.C. pumping, are distributed uniformly along the length of the amplifier. Amplification in the pump region is accomplished by coupling between the electrostatic equivalent of a fast "cyclotron" wave and a slow "cyclotron" wave. Therefore, $n$ of Equation 1 is one, and some spatial periodicity within the electrostatic focusing system is made to coincide with one half the wavelength of the electron beam at the natural resonant frequency caused by the focusing lenses.

The specific nature of the invention, as well as other objects, uses and advantages thereof, will clearly appear from the following description and from the accompanying drawing, in which.

Figure 1:
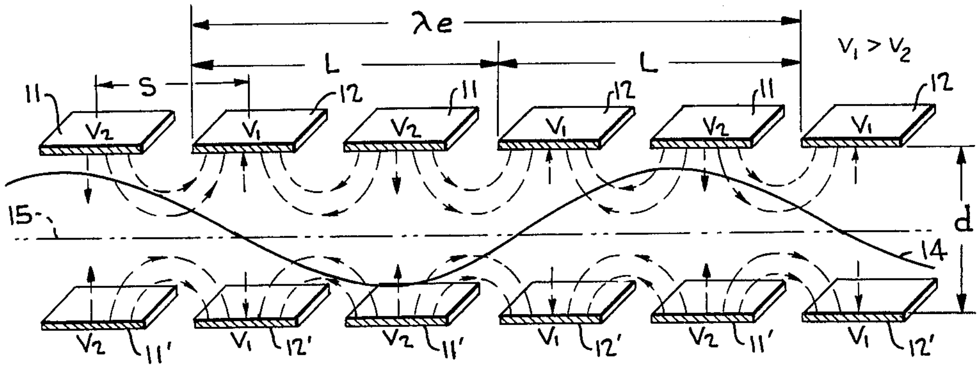
FIG. 1 is illustrative of one embodiment of this invention wherein the D.C. voltage variation that acts to focus the beam electrostatically serves as the varying spatial periodic parameter.

Referring to FIG. 1, there is represented one embodiment, constructed in accordance with the teachings of this invention, for amplifying transverse waves on electron beams by interaction with a periodic electrostatic field. A series of deflector plates 11 and 12 are periodically spaced. Deflector plates 11 and 12 are actually in pairs, 11–11′ and 12–12′. A first voltage $V_1$ is applied to the plates 12–12′, and a second voltage $V_2$ is applied to the plates 11–11′. In FIG. 1 the voltage $V_1$ is greater than the voltage $V_2$, and the arrows between the plates 11 and 12 represent the electrostatic forces acting on electrons established by the two voltages. The deflector electrodes 11 and 12 are maintained at a potential positive with respect to the cathode of the electron gun (not shown) which produces the electron beam 14. The potential difference between plates 11 and 12 establishes a series of convergent electrostatic lenses along the direction of electron beam travel, and the electron lens field thus established acts to prevent the beam thickness from increasing.

Electron focusing is caused by the electric field established between individual pairs of deflector elements 11 and 12. Along a center plane, indicated by line 15, the transverse field is 0; it increases with distance from the center line. Consequently, it may be shown that electrons of the beam are subjected to a force which tends to accelerate them away from the center plane 15 in regions of high potential, and they are accelerated towards the center plane 15 in low potential regions, so that small ripples are imposed on the electron trajectories. The low-potential regions, however, exert the major influence because the electrons are farther from the center plane as the beam traverses these regions, and are consequentially in a stronger field; at the same time electrons move more slowly through the low potential regions, hence require more time to traverse them. The two effects are equally strong, and result in a net force tending to deflect the electrons towards the center plane of the reference path. This is comparable to an elastic force; consequentially, the beam electrons follow simple harmonic motion trajectories centered about the center plane 15. The line 14 indicates the trajectory of an electron as it traverses the plates 11 and 12. As indicated, the electron follows substantially a sinusoidal path with minor ripples, each ripple corresponding to one spatial period L of the D.C. potential variation. The electron trajectory has a definite wavelength which may be determined approximately in accordance with the equation:

$$\lambda=\frac{2V_0L}{V_a} \qquad (2)$$

where $V_0$ is the average D.C. potential of the electrostatic focusing structure elements 11 and 12, $V_a$ is the peak amplitude of the varying potential component at the center plane 15, and L is the spatial periodicity of voltage variation, in meters. The equation is accurate only if the D.C. potential is a sinusoidal function of distance along the center plane 15 of the focusing structure, and $V_a/V_0 \ll 1$.

Gain is achieved through this mechanism of D.C. pumping by having the electrons in the beam 14 traverse one spatial period $L_1$ of D.C. voltage variation (due to the electrostatic focusing system) on one half the natural resonant wavelength of the electron beam. Study of the paraxial-ray equation, a form of Hill's equation, shows that this condition is the condition of beam instability. Namely, the transverse natural resonant wavelength, $\lambda$, will decrease continuously with increasing lens strength $$\epsilon=\frac{V_a}{V_a}$$

up to the point where $\lambda_e=2L$, corresponding to a value of $E=0.613$. At this point the beam becomes unstable, the transverse displacements in the beam growing exponentially along the length of the electrostatic focusing system. This condition, $\lambda_e=2L$, satisfies Equation 1. The instability occurring in the solution of the paraxial-ray equation may, therefore, be looked upon as being due to a condition of parametric pumping.

Applicant has determined that regardless of the phase at which the electron beam enters the pump region, after having traversed the space of one or two focusing plates, the electron beam will become locked in phase, experiencing its maximum displacement just in front of a point of minimum potential. Therefore, the representation shown in FIG. 1 represents, with the exception of a few special cases, the phase of all electrons in the focusing structure at a short distance after entering the pump region, regardless of the initial entry phase of the electron into the focusing structure.

Since the focusing lens strength is sufficient to cause instability of the electron beam, the electrons within the beam also tend to be unstable, and the beam 14 is subject to transverse beam spread. This is obviously detrimental, as it places a limit on the available gain which can take place before the beam hits the structure. The beam spread is unavoidable in the case of zero space charge, but is controllable if there is sufficient space charge density. Under optimum conditions the tube should be operated with a beam current sufficient to produce equilibrium perveance. This beam current will depend upon the dimensions of the pump structure and the strength of the focusing lenses. Equilibrium perveance corresponds to the condition where the repulsive space charge forces in the beam exactly counterbalance the electrostatic focusing forces.

Figure 2:
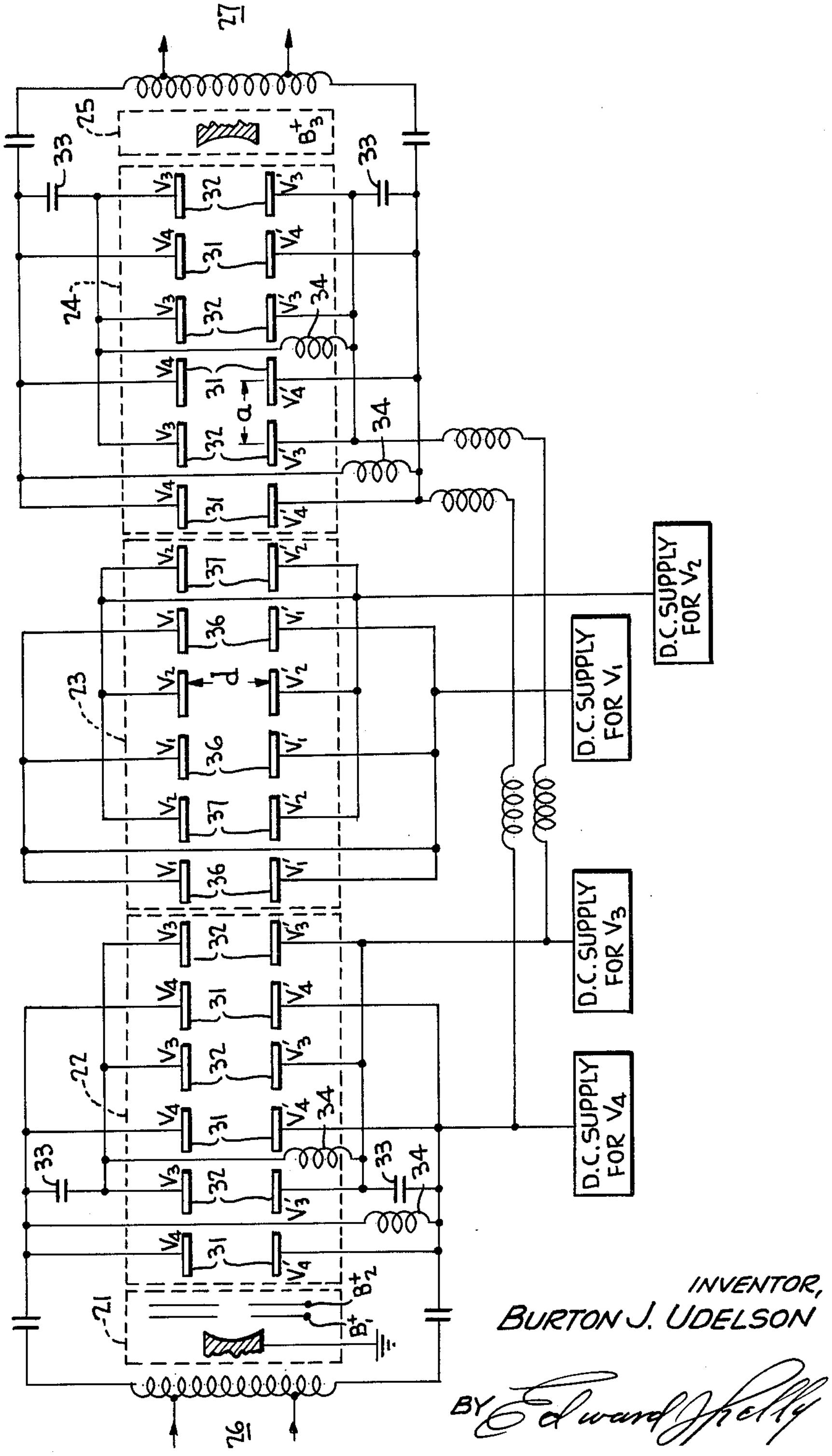
FIG. 2 is a specific embodiment of a D.C. pumped electrostatically focused amplifier of the type described in connection with FIG. 1.

Referring now to FIG. 2, there is shown a specific embodiment employing the principles of this invention. As indicated by the dotted lines, the amplifier of FIG. 2 is comprised of several major components. There are: an electrostatic fast wave output coupler 24, and a collecpler 22, an electrostatically focused D.C. pump region 23, an electrostatic fast wave outputc oupler 24, and a collector 25. The input signal to be amplified is applied to the input coupler 22 at 26, and the output from output coupler 24 appears at 27. The amplifier tube is inclosed in an evacuated envelope (not shown), and suitable voltages are applied to the electron gun 21 and collector 25 as indicated.

The electron gun 21 develops a sheet beam which is projected in the direction of collector 25. In the coupler regions 22 and 24 the beam passes between a series of pairs of identical planar plates 31 and 32 at alternate D.C. voltages $V_4$ and $V_3$. The voltage difference as previously explained, between adjacent pairs of plates forms an electrostatic field which acts to focus the beam by creating a time average restoring force, accelerating the electrons toward the plane midway between the plates. The electrons in such a focusing system have a natural transverse resonance frequency $f_e$, given approximately the equation:

$$f_e=0.374\times10^6\left(\frac{E'}{L}\right)\sqrt{V_0}\left[\sum_{N=1,2,3\ldots}^{\infty}\frac{1}{\cosh^2(N\pi d/L)}\right]^{1/2} \quad (3)$$

where, $V_0$=the space average beam voltage, $$\frac{V_3+V_4}{2}$$

$L$=the spatial periodicity of D.C. voltage variation,
$d$=separation between opposing plate pairs, $$E'=\frac{V_3-V_4}{2V_0}$$

Equation 3 is merely a more exact expression for the natural resonant condition given in Equation 2 because it takes into account the higher frequency components present on the D.C. potential along the center plane. The plates of the input coupler 22 and the output coupler 24 are connected so that they form the capacitance of a tank circuit, wherein all the plates on each side of the beam are at the same RF potential. This is accomplished by means of capacitors 33. The tank circuit should be designed to resonate at approximately the frequency $f_5$ of the signal applied at 26, to be amplified. This is done by proper choice of the inductances 34 in parallel with the capacitance formed by the plates. The output and input couplers are identical. The leads for the input and output signals are tapped off RF coils at 26 and 27 to provide a transformer action which reduces the mismatch between the resistive loading of the coupler and the characteristic impedance of the transmission line.

The theory of Cuccia—"The Electron Coupler—A Developmental Tube For Amplitude Modulation and Power Control at Ultrahigh Frequencies," RCA Review, Vol. 10, page 278; June 1949—applies to the input and output couplers. Thus, if the signal frequency $f_5$ is approximately equal to the natural resonant beam frequency, and if the equation developed by Cuccia in the aforementioned article is satisfied, all of the energy introduced across the plates of the input coupler will be transferred to the sheet beam travelling through the coupler plates in the form of a transverse oscillatory motion of the beam. Simultaneously, the inherent beam noise will be stripped off the beam. The output coupler performs the inverse function of the input coupler; i.e., it acts to convert the transverse motion of the sheet beam entering the coupler into a RF signal in the load connected to the output coupler.

The D.C. pump region 23 is essentially the same as that shown and described in connection with FIG. 1. Alternate plates 36 and 37 are maintained at D.C. potentials $V_1$ and $V_2$, respectively. As described, the pump section 23 should be operated so that $$E_p'\equiv\frac{V_1-V_2}{V_1+V_2}$$

the lens strength, has a value above the critical value at which the beam becomes unstable. This critical $E_p'$ corresponds to a value of $$E_p=\frac{V_a}{V_0}$$

at the center plane equal to 0.613. Gain is achieved by increasing the amplitude of the transverse oscillation of the electron sheet beam as it travels from the input coupler 22 to the output coupler 24. As described with FIG. 1, this increase is accomplished in the pumping section 23 when the wavelength $\lambda_e$, at the natural resonant frequency of the beam in the pumping section is equal to twice the period of D.C. voltage variation along the pump structure. The gain in the pump region may be varied by changing the value of $E_p'$ within the range of instability, increasing gain being gained with increasing $E_p'$. The factors limiting the amount of gain obtainable in the D.C. pump region are: The beam will hit the pump structure when the amplitude of the transverse beam excursion becomes too large, and the beam thickness may increase too rapidly if the space charge density is not sufficiently high.

Figure 3:
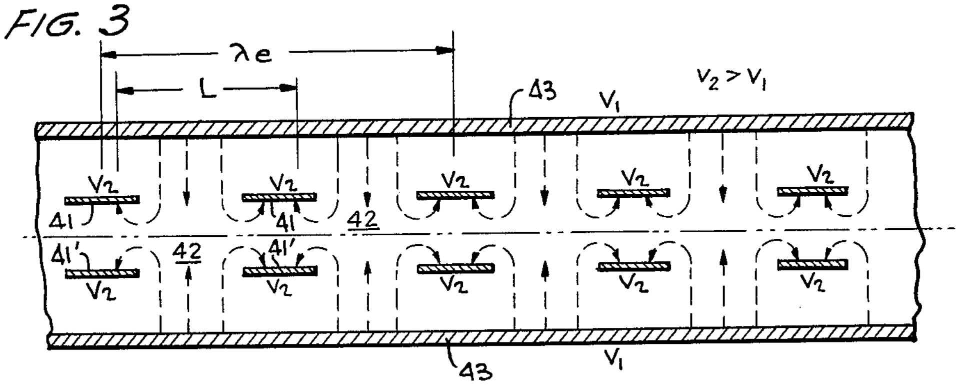
FIG. 3 shows a preferred ladder line type construction for the focusing and coupling plates, which may be used in the practice of this invention.

Any of a number of planar periodical electrostatic focusing structures may be used in the practice of this invention. FIG. 3 shows a ladder line structure which has the advantage of ease of construction. The ladder lines shown in FIG. 3 have rungs 41 and 41' which serve as the periodic focusing plates. Behind the ladder lines are conducting plates 43. With the plates 43 maintained at the potential $V_1$, the rungs 41 and 41' of the ladder lines are maintained at a second potential $V_2$, the electrostatic forces acting on electrons are arranged substantially as pictured by the arrows. This structure results in a voltage $V_2$ in the regions of the rungs 41 and 41' and a lower voltage $V_3$ in the slot area 42. This of course satisfies the requirement for a periodically varying D.C. voltage, and the geometry of the two ladder lines and the voltages $V_1$ and $V_2$, may be adjusted to fulfill the relations described and developed in connection with FIG. 1.

Figure 5:
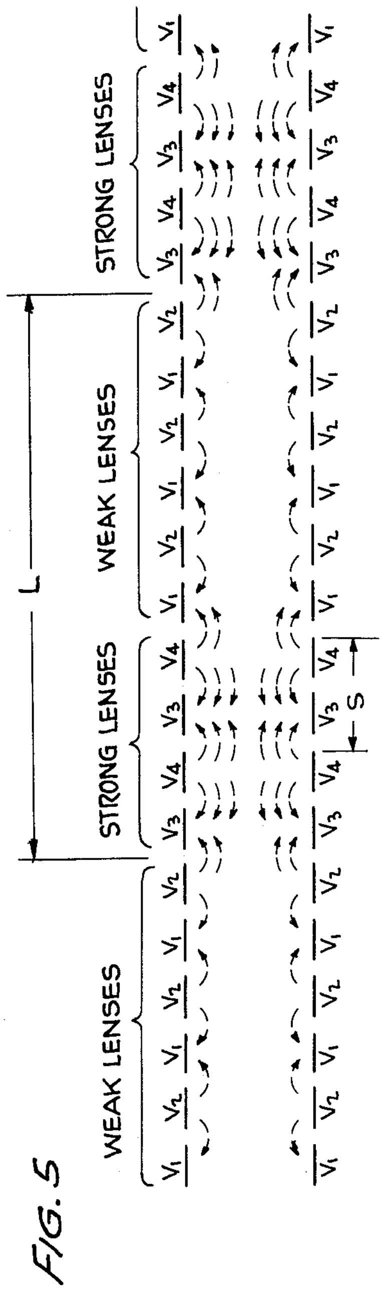
FIG. 5 is a specific embodiment of the species described in connection with FIG. 4.
Figure 6:
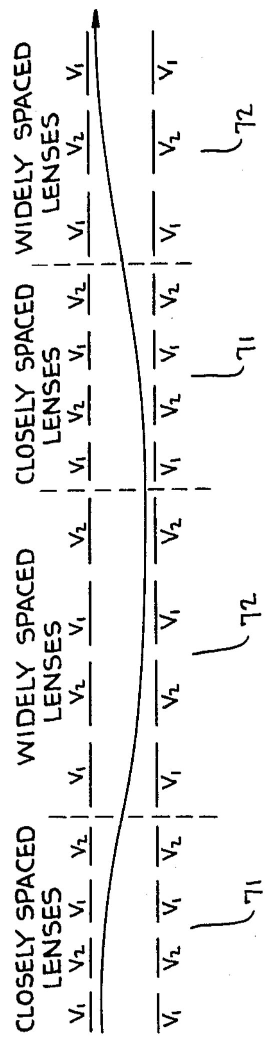
FIG. 6 is another specific embodiment of the species wherein the spatial periodicity of the electrostatic focusing lenses is the varying spatial periodic parameter.

The embodiment of this invention shown and described in connection with FIGS. 1 and 2 requires a high lens strength in the pump region, as previously explained. The presence of a high lens strength means a high natural resonant frequency for the electron beam in the pump region. This is undesirable from the standpoint of achieving a high efficiency, because the degree of beam mono-energeticity may be enhanced by operating the pump region such that the natural resonant frequency $f_e$ is low compared with the frequency of the signal to be amplified. With a substantially mono-energetic beam, the amplifier efficiency may be enhanced by the use of a depressed collector. Two alternate embodiments of this invention, not requiring high lens strengths in the pump region, are shown in FIGS. 4, 5, and 6.

Figure 4:
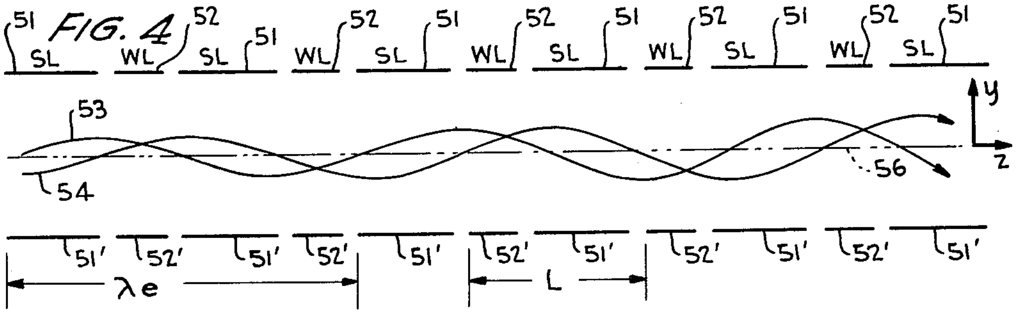
FIG. 4 shows another embodiment of this invention wherein the strength of the electrostatic focusing lenses is the varying spatial periodic parameter.

FIG. 4 shows an electrostatically focused D.C. pumped parametric amplifier with the pump region divided into alternate groups of strong lenses 51 and weak lenses 52. The value of $$E=\frac{V_a}{V_0}$$

is made greater in the strong lens sections 51 than in the weak lens sections 52. The period, $L_1$ of the variation of these strong and weak lenses is made equal to one half the natural resonant electron wave length, $\lambda_e$. Thus, Equation 1 is satisfied, for $n=1$. For convenience of explanation, assume that $V_0$, the time average voltage on the electron beam along the center axis 56 of the focusing structure has been adjusted to be the same for both the strong and weak lens sections. In a given plane off the center axis 56, the time average potential will be lower in the weak lens section than it is in the strong lens section. In fact, the difference between the time average potential at a plane off the ecnter axis 56 and that on the center axis 56 is an integral part of the electrostatic focusing mechanism; the difference of time average potential creates a time average force that tends to push the electrons towards the center axis. Therefore, an electron going from a weak lens section 51 to a strong lens section 52, when its transverse displacement is at a maximum (as is the case for electron 53), will have its longitudinal velocity decreased because of the drop of time average potential at the plane away from the center axis. However, the electron will also undergo a corresponding increase of transverse potential energy. When electron 53 traverses from a strong lens section 51 to a weak lens section 52 at the center axis 56 no energy exchange takes place. For electron 54, 90° out of phase with electron 53, the electron has its maximum transverse displacement when traveling from the strong lens region to a weak lens region. Thus, this electron will undergo an increase in longitudinal velocity and a corresponding decrease in transverse potential energy.

If higher order Fourier components are disregarded, and it is assumed that the voltage variation along the center axis is a pure sinusoid, the formula for the voltage variation along the center axis for the strong lens section is:

$$V=V_0[1+E_1 \sin(2\pi 2/L) \cos h(2\pi Y/L)] \quad (4)$$

and for the weak lens section is:

$$V=V_0[1+E_2 \sin(2\pi 2/L) \cos h(2\pi Y/L)] \quad (5)$$

where, $V_0$=the space average beam voltage, $$E_1=\frac{V_{a1}}{V_0}$$

$$E_2=\frac{V_{a2}}{V_0}$$

$V_{a1}$ and $V_{a2}$ are respectively the peak values of the sinusoidal variation of D.C. potential along the center axis for the strong and weak lens sections.

The increase of amplitude per electron wave length for an electron in the phase represented by 53 is $2E_1/E_2$, while the decrease of amplitude per electron wave length of an electron in phase with electron 54 is $E_2/2E_1$. In actuality, all phase angles of the electron beam with respect to the D.C. pumping structure will be present. The shape of the beam emerging from the output of the D.C. pump will depend upon the interactions that have taken place over all phases. However, as in the quadrupole amplifier, a net gain results, because the exponential growth of the transverse beam displacement outweighs the exponential drop.

The amplifier described in connection with FIG. 4 is also subject to transverse beam spread as was the embodiment described in connection with FIGS. 1 and 2. Again, the beam spread can be controlled by making the space charge density of the electron beam approach the equilibrium perveance condition.

FIG. 5 represents a specific embodiment of the electrostatically focused D.C. pump described in connection with FIG. 4. The structure consists of a series of focusing plates 61 similar to those shown in FIG. 1. The focusing plates 61 are divided into two groups, those that make up the weak lens sections 62, and those that make up the strong lens section 63. The periodic voltage applied to the deflector plates 61 in the weak sections are $V_1$ and $V_2$. In the strong lens sections the periodic voltages applied to the deflector plates 61 are $V_3$ and $V_4$. The criterion for having weak and strong lens sections is that $$\frac{V_3-V_4}{V_3+V_4}$$

be greater than $$\frac{V_1-V_2}{V_1+V_2}$$

As pointed out in connection with FIG. 4, the condition for parametric amplification is that the wavelength $\lambda_e$ of the electron beam at its natural resonant frequency is twice the periodicity of variation of the weak and strong lens sections.

As can be seen from an inspection of FIG. 5 the weak lens sections have been made longer than the strong lens sections. This is necessary in order to make each lens section a quarter of an electron beam wavelength long $\lambda_e/4$, taking into account the fact that the electron beam wavelength increases with decreasing lens strength, see Equation 2. By incorporating this inequality of lens length in the focusing sections, greater efficiency results than with a similar device having all the focusing sections of equal length.

Of course, rather than the structure shown in FIG. 5, a ladder line construction similar to that shown in FIG. 3 may be used if desired. In such a case, several ladder line sections similar to that shown in FIG. 3, would be used in combination, each ladder line section comprising one strong or one weak lens section.

FIG. 6 shows an embodiment similar to FIG. 5, but requiring only two focusing voltages. The electrostatic focusing structure of FIG. 6 is divided into two alternate groups of lenses similar to FIG. 5, but instead of varying the lens strength, the periodicity of the D.C. voltage variation is made to be the changing parameter between the two groups of lenses. This achieves the same effect of varying periodically the time average restoring force acting to pull the electrons toward the axis of the structure. In FIG. 6 the effect is achieved by varying the number of lenses per unit length of the electron path, rather than varying the lens strength in each lens as in FIG. 5. In this embodiment, the D.C. pumping structure has alternately a group of closely spaced focusing plates 71 and a series of widely spaced focusing plates 72.

To achieve D.C. pumping only two D.C. potentials $V_1$ and $V_2$ are needed, and these potentials are adjusted so that the closely spaced lens 71 and the widely spaced lens 72 are each a quarter electron beam wavelength long. Since the electron wavelength is approximately proportional to the periodicity of the D.C. voltage variation, as shown in Equation 2, the number of focusing plates in both the closely spaced lens 71 and the widely spaced lens 72 will be the same. The beam motion in this D.C. pump and the gain mechanism are essentially the same as that described in connection with FIG. 5.

It will be apparent that the embodiments shown are only exemplary and that various modifications can be made in construction and arrangement within the scope of the invention as defined in the appended claims.

I claim as my invention:

1. A D.C. pumped electrostatically focused electron beam parametric amplifier comprising:

(a) an electron gun which develops a sheet electron beam, (b) a collector longitudinally spaced from said electron gun and positioned to receive an electron sheet beam developed by said electron gun, (c) an electrostatic fast wave input coupler positioned adjacent said electron gun to transfer signal input energy to a sheet electron beam developed by said electron gun, (d) an electrostatic fast wave output coupler positioned adjacent said collector to convert the transverse motion of a sheet electron beam developed between said electron gun and said collector into an output signal, and (e) an electrostatically focused D.C. pump positioned between said electrostatic fast wave input coupler and said electrostatic fast wave output coupler and consisting of a plurality of electrostatic focusing lenses periodically spaced longitudinally along the path of a sheet electron beam developed between said electron gun and said collector and serving to focus and prevent the spread of said sheet electron beam, said plurality of electrostatic focusing lenses being composed of planar electrodes lying in planes on either side of and parallel to a central plane extending longitudinally between said electron gun and said collector, the lens strength of said plurality of electrostatic focusing lenses being above the critical value at which a sheet electron beam developed between said electron gun and said collector becomes unstable causing such a sheet electron beam to have a natural frequency of transverse oscillation about said central plane, the amplitude of said transverse oscillation increasing exponentially along the longitudinal length of said electrostatically focused D.C. pump, the longitudinal spatial periodicity of said plurality of electrostatic focusing lenses being one half the wavelength of a sheet electron beam developed between said electron gun and said collector at its natural resonant frequency within said electrostatically focused D.C. pump.

2. A D.C. pumped electrostatically focused electron beam parametric amplifier as recited in claim 1 wherein said plurality of electrostatic focusing lenses comprise:

(a) a plurality of pairs of electrostatic deflector plates uniformly spaced longitudinally along the path of a sheet electron beam developed between said electron gun and said collector, one plate of each pair being positioned to be on one side of the sheet electron beam and the other plate of each pair being positioned to be on the other side of the sheet electron beam, (b) means for maintaining alternate pairs of said electrostatic deflector plates at a first D.C. potential, and (c) means for maintaining the remaining pairs of said electrostatic deflector plates at a second D.C. potential.

3. A D.C. pumped electrostatically focused electron beam parametric amplifier as recited in claim 1, wherein said plurality of electrostatic focusing lenses comprise:

(a) a first ladder line positioned on one side of a sheet electron beam developed between said electron gun and said collector, said first ladder line having uniformly spaced rungs perpendicular to the path of the sheet electron beam.

(b) a second ladder line identical to said first ladder line and positioned on the other side of the sheet electron beam in alignment with said first ladder line, (c) a first conducting sheet positioned adjacent to the side of said first ladder line remote from the sheet electron beam, (d) a second conducting sheet positioned adjacent to the side of said second ladder line remote from the sheet electron beam, (e) means for maintaining said first and second ladder lines at a first D.C. potential, and (f) means for maintaining said first and second conducting sheets at a second D.C. potential.

4. A D.C. pumped electrostatically focused electron beam parametric amplifier as recited in claim 1 wherein said plurality of electrostatic focusing lenses comprise a series of alternate sections of strong electrostatic focusing lenses and sections of weak electrostatic focusing lenses with the longitudinal spatial period of said strong and weak lens sections being one half the wavelength of a sheet electron beam developed between said electron gun and said collector at the sheet electron beam's natural resonant frequency.

5. A D.C. pumped electrostatically focused electron beam parametric amplifier as recited in claim 1 wherein said plurality of electrostatic focusing lenses comprise a series of alternate sections of closely spaced electrostatic focusing lenses and sections of widely spaced electrostatic focusing lenses with the longitudinal spatial period of closely spaced and widely spaced lens sections being one half the wavelength of a sheet electron beam developed between said electron gun and said collector at the sheet electron beam's natural resonant frequency.

References Cited by the Examiner

UNITED STATES PATENTS 3,148,302 9/64 Clavier et al. ---------- 330—4.7

FOREIGN PATENTS 912,407 12/62 Great Britain.

OTHER REFERENCES

Udelson: "Proceedings of the IRE," August 1960, pages 1485–1486.

ROY LAKE, *Primary Examiner.*